(12) United States Patent
Li et al.

(10) Patent No.: US 11,775,763 B2
(45) Date of Patent: Oct. 3, 2023

(54) WEAKLY SUPERVISED AND EXPLAINABLE TRAINING OF A MACHINE-LEARNING-BASED NAMED-ENTITY RECOGNITION (NER) MECHANISM

(71) Applicant: Robert Bosch GmbH, Stuttgart (DE)

(72) Inventors: Jiacheng Li, La Jolla, CA (US); Haibo Ding, Santa Clara, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 17/185,633

(22) Filed: Feb. 25, 2021

(65) Prior Publication Data

US 2022/0269862 A1   Aug. 25, 2022

(51) Int. Cl.
*G10L 15/00* (2013.01)
*G06F 40/295* (2020.01)
*G06N 3/08* (2023.01)
*G06N 3/042* (2023.01)

(52) U.S. Cl.
CPC .......... *G06F 40/295* (2020.01); *G06N 3/042* (2023.01); *G06N 3/08* (2013.01)

(58) Field of Classification Search
CPC ........ G06F 40/295; G06N 3/042; G06N 3/08; G10L 15/22; G10L 15/00
See application file for complete search history.

(56) References Cited

U.S. PATENT DOCUMENTS

| | | | |
|---|---|---|---|
| 9,009,134 B2 * | 4/2015 | Xu | G06F 16/951 707/731 |
| 10,853,401 B2 * | 12/2020 | Pendar | G06F 16/35 |

(Continued)

OTHER PUBLICATIONS

Wen, Y., Fan, C., Chen, G., Chen, X., Chen, M. (2020). A Survey on Named Entity Recognition. In: Liang, Q., Wang, W., Liu, X., Na, Z., Jia, M., Zhang, B. (eds) Communications, Signal Processing, and Systems. CSPS 2019. Lecture Notes in Electrical Engineering, vol. 571. Springer, Singapore. (Year: 2020).*

(Continued)

*Primary Examiner* — Paras D Shah
*Assistant Examiner* — Uthej Kunamneni
(74) *Attorney, Agent, or Firm* — Michael Best & Friedrich LLP

(57) ABSTRACT

Systems and methods for weakly-supervised training a machine-learning model to perform named-entity recognition. All possible entity candidates and all possible rule candidates are automatically identified in an input data set of unlabeled text. An initial training of the machine-learning model is performed using labels assigned to entity candidates by a set of seeding rules as a first set of training data. The trained machine-learning model is then applied to the unlabeled text and a subset of rules from the rule candidates is identified that produces labels that most accurately match the labels assigned by the trained machine-learning model. The machine-learning model is then retrained using the labels assigned by the identified subset of rules as the second set of training data. This process is iteratively repeated to further refine and improve the performance of the machine-learning model for named-entity recognition.

20 Claims, 3 Drawing Sheets

(56) References Cited

U.S. PATENT DOCUMENTS

2013/0159277 A1* 6/2013 Liu ............ G06F 40/211
707/E17.089
2020/0279279 A1* 9/2020 Chaudhuri ........ G06Q 30/0201

OTHER PUBLICATIONS

Li, Zz., Feng, Dw., Li, Ds. et al. Learning to select pseudo labels: a semi-supervised method for named entity recognition. Front Inform Technol Electron Eng 21, 903-916 (2020). (Year: 2020).*
Bach et al., "Learning the Structure of Generative Models without Labeled Data", Proceedings of the 34th International Conference on Machine Learning, Sep. 2017, 16 pages.
Bach et al., "Snorkel DryBell: A Case Study in Deploying Weak Supervision at Industrial Scale", SIGMOD, Jun. 2019, 14 pages.
Craven et al., "Constructing Biological Knowledge Bases by Extracting Information from Text Sources", American Association for Artificial Intelligence, 1999, 10 pages.
Devlin et al., "BERT: Pre-training of Deep Bidirectional Transformers for Language Understanding", Proceedings of the 2019 Conference of the North American Chapter of the Association for Computational Linguistics, May 2019, 16 pages.
Dixit et al., "Span-Level Model for Relation Extraction", Proceedings of the 57th Annual Meeting of the Association for Computational Linguistics, Jul. 2019, pp. 5308-5314.
Fries et al., "SwellShark: A Generative Model for Biomedical Named Entity Recognition without Labeled Data", Apr. 2017, 11 pages.
Giannakopoulos et al., "Unsupervised Aspect Term Extraction with B-LSTM & CRF using Automatically Labelled Datasets", Proceedings of the 8th Workshop on Computational Approaches to Subjectivity, Sentiment and Social Media Analysis, Sep. 2017, pp. 180-188.
He et al., "Jointly Predicting Predicates and Arguments in Neural Semantic Role Labeling", Proceedings of the 56th Annual Meeting of the Assoication for Computational Linguistics, Jul. 2018, pp. 364-369.
He, "Autoentity: Automated Entity Detection from Massive Text Corpora", Thesis submission to the University of Illinois at Urbana-Champaign, 2017, 36 pages.
Jiang et al., "Generalizing Natural Language Analysis through Span-relation Representations", May 2020, 14 pages.
Lample et al., "Neural Architectures for Named Entity Recognition", Apr. 2016, 11 pgs.
Lee et al., "End-to-end Neural Coreference Resolution", Dec. 2017, 10 pages.
Luan et al., "A General Framework for Information Extraction using Dynamic Span Grahps", Apr. 2019, 11 pages.
Ma et al., "End-to-end Sequence Labeling via Bi-directional LSTM-CNNs-CRF", May 2016, 12 pages.
Mintz et al., "Distant supervision for relation extraction without labeled data", Proceedings of the 47th Annual Meeting of the ACL and the 4th IJCNLP of AFNLP, Aug. 2009, pp. 1003-1011.
Peng et al., "Distantly Supervised Named Entity Recognition using Positive-Unlabeled Learning", Proceedings of the 57th Annual Meeting of the Association for Computational Linguisitcs, Aug. 2019, pp. 2409-2419.
Pennington et al., "GloVe: Global Vectors for Word Representation", Proceedings of the 2014 Conference on Empirical Methods in Natural Language Processing, Oct. 2014, pp. 1532-1543.
Ratinov et al., "Design Challenges and Misconceptions in Named Entity Recognition", Proceedings of the 30th Conference on Computational Natural Language Learning, Jun. 2009, pp. 147-155.
Ratner et al., "Snorkel: Rapid Training Data Creation with Weak Supervision", Proceedings of the VLDB Endowment, vol. 11, No. 3, Nov. 2017, 17 pages.
Shang et al., "Learning Named Entity Tagger using Domain-Specific Dictionary", Proceedings of the 2018 Conference an Empirical Methods in Natural Language Processing, Sep. 2018, 11 pages.

* cited by examiner

WEAKLY SUPERVISED AND EXPLAINABLE TRAINING OF A MACHINE-LEARNING-BASED NAMED-ENTITY RECOGNITION (NER) MECHANISM

BACKGROUND

The present invention relates to systems and methods for performing named-entity recognition (NER) using machine-learning techniques and, more specifically, for training named-entity recognition (NER) models.

SUMMARY

Named-entity recognition (NER) is a mechanism in which automated processing (e.g., computer-based processing) is applied to unstructured text in order to identify and categorize occurrences of "named entities" (e.g., people, businesses, locations, etc.) in the unstructured text. For example, in some implementations, NER is a machine-learning-based natural language processing mechanism in which unstructured natural-language sentences are provided as input to a machine-learning model and the output of the machine-learning model includes an indication of an assigned category for each "entity" (or potential entity) in the sentence (e.g., words or phrases that appear in the sentence that the machine-learning model determines may correspond to proper names, objects, etc.). For example, if the input sentence provided to as input recites: "John is travelling to London," the output of a trained NER machine-learning model may indicate the "John" is categorized as a "person" and "London" is categorized as a "location."

In some implementations, named-entity recognition (NER) is an essential task for many downstream information extraction tasks (e.g., relation extraction) and knowledge base construction. Supervised training of named-entity recognition has achieved reliable performance due, for example, to advances in deep neural models. However, supervised training of an NER model requires a large amount of manual annotation of data for training. This can require significant amounts of time in all cases but is particularly challenging in some specific domains and/or when training an NER model for low resource languages, where domain-expert annotation is difficult to obtain.

In some implementations, "distantly supervised" training is used to automatically generate labeled data from open knowledge bases or dictionaries. Distant supervision makes it possible to generate training data for NER models at a large scale without expensive human efforts. However, all distantly supervised methods rely on an existing knowledge base or dictionary and, in some cases, an open knowledge base is not available (e.g., in the biomedical field, technical documents, etc.).

Accordingly, in some implementations, the systems and methods described herein provide a "weakly supervised" mechanism for training a machine-learning NER model. In the weakly-supervised approach, a small set of symbolic rules—referred to herein as "seeding rules"—is used to label data in unstructured text. In some implementations, the seeding rules and their associated labels may be provided or defined manually for a specific task (i.e., the task for which the NER model is to be trained). After applying the seeding rules to the unstructured text using the seeding rules, the weakly-labeled data is used to train an initial iteration of an artificial neural network-based NER model. The unstructured text is also processed to automatically identify a plurality of potential rules for labelling "named-entities." The automatically identified rules are applied to the unstructured text and the text/label combinations determined by the rules are compared to the text/label combinations determined by the initial iteration of the NER model. The most successful "rules" are identified using a scoring metric and are then applied to the original unstructured text to generate another set of training data. The NER model is then retrained based on the data as labeled by the new set of selected rules. This training process is iteratively repeated to continue to refine and improve the NER model.

In some implementations, the "weakly supervised" mechanism for training the NER model uses bootstrapping to generate weakly labeled data with symbolic rules and also automatically trains the NER model to recognize entities with neural representations. For example, in some implementations, the initial seeding rules may include a rule such as "located in _____" to explicitly identify at least some locations in the unstructured text. In addition, by comparing low-dimension neural representations (i.e., word embeddings) and iteratively retraining the NER model, the NER model can be trained to identify new entities. The framework described in the examples below uses both explicit logical rules and neural representations to find new entities from an unlabeled corpus (e.g., the unstructured text) iteratively. Also, because the systems and methods use logical rules to obtain weak labels and recognize entities, each system prediction provided by the trained NER model can be traced back to original logical rules, which makes the prediction results explainable.

In one embodiment, the invention provides a method for training a machine-learning model to perform named-entity recognition. All possible entity candidates and all possible rule candidates are automatically identified in an input data set of unlabeled text. An initial training of the machine-learning model is performed by applying a set of seeding rules to the input data set to assign labels to the entity candidates and using the label assignments as a first set of training data. The trained machine-learning model is then applied to the unlabeled text and a subset of rules from the rule candidates is identified that produces labels that most accurately match the labels assigned by the trained machine-learning model. The machine-learning model is then retrained using the labels assigned by the identified subset of rules as the second set of training data. The process of applying the retrained model, identifying a subset of rules that assign labels that most accurately match the labels assigned by the retrained model, and performing an additional retraining of the model are iteratively repeated to further refine and improve the performance of the machine-learning model for named-entity recognition.

In another embodiment the invention provides a system for training a machine-learning model to perform named-entity recognition. The system includes an electronic processor that is configured to identify all possible entity candidates and all possible rule candidates in an input data set of unlabeled text. The electronic processor performs an initial training of the machine-learning model by applying a set of seeding rules to the input data set to assign labels to the entity candidates and using the label assignments as a first set of training data. The electronic processor then applies the trained machine-learning model to the unlabeled text and a subset of rules from the rule candidates is identified that produces labels that most accurately match the labels assigned by the trained machine-learning model. The electronic processor then retrains machine-learning model using the labels assigned by the identified subset of rules as the second set of training data. The process of applying the retrained model, identifying a subset of rules that assign labels that most accurately match the labels assigned by the retrained model, and performing an additional retraining of the model are iteratively repeated to further refine and improve the performance of the machine-learning model for named-entity recognition.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
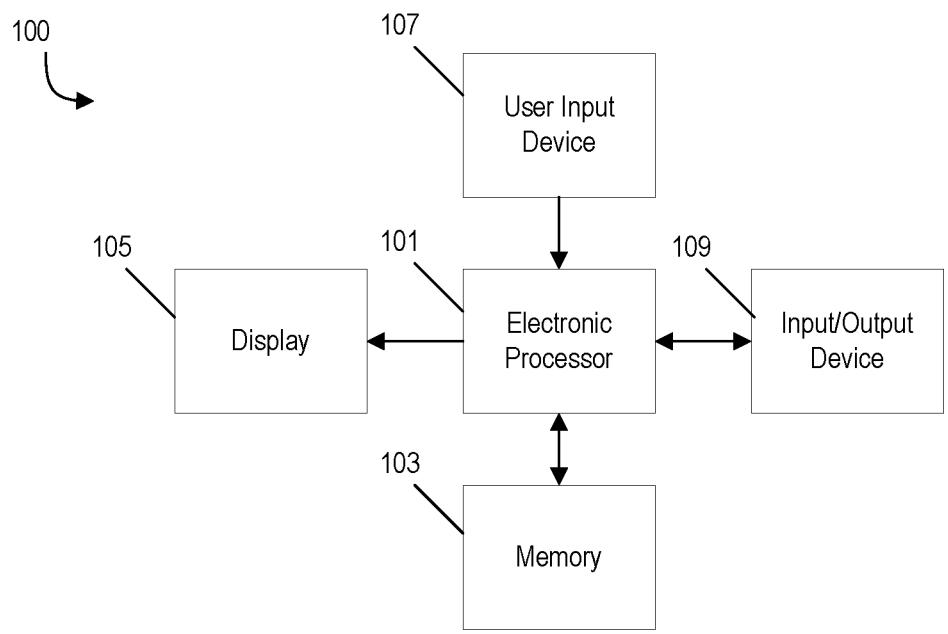
FIG. 1 is a block diagram of a system for training and using a machine-learning-based named entity recognition (NER) mechanism according to one embodiment.

FIG. 1 illustrates an example of a computer-based system 100 that may be configured for training a named-entity recognition (NER) machine-learning mechanism, for applying a trained NER mechanism, or both. The system 100 includes an electronic processor 101 and a non-transitory computer-readable memory 103. The memory 103 stores data and computer-executable instructions that are accessed and executed by the electronic processor 101 to provide the functionality of the system 100 including, for example, the functionality described herein below. The electronic processor 101 is communicative coupled to a display 105 and a user input device 107 (e.g., a keyboard, mouse, touch screen, etc.) to provide a user interface for operating the system 100 and for displaying data to a user. The electronic processor 101 is also communicatively coupled to an input/output device 109 (e.g., a wired or wireless communication interface) for communicating with other computer-based systems.

Figure 2:
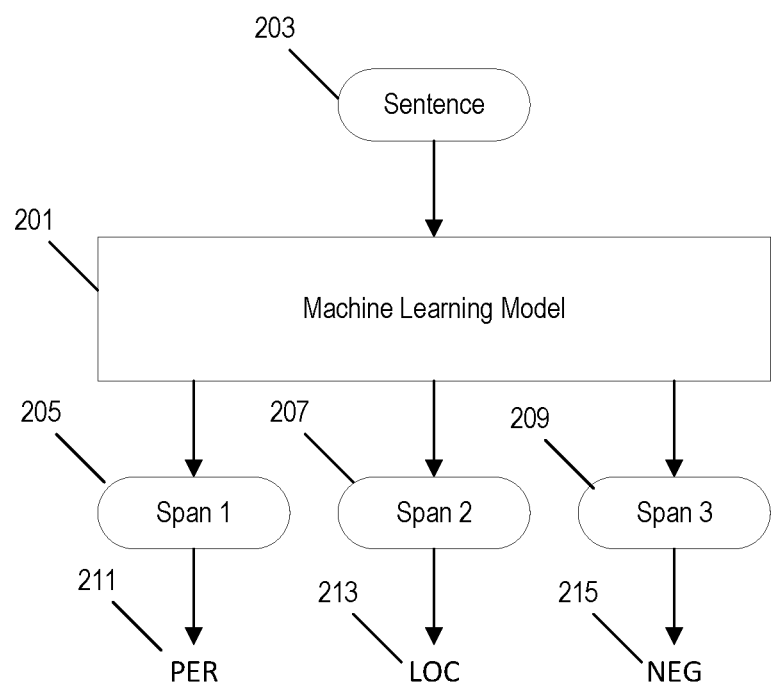
FIG. 2 is a schematic diagram of one example of the NER mechanism trained and/or applied using the system of FIG. 1.

FIG. 2 illustrates an example of a machine learning model trained and/or applied by the system 100 of FIG. 1. The machine learning model 201 is configured to receive as input unstructured and unlabeled text including, for example, a textual sentence 203. In response to receiving the input text, the machine learning model is configured to output each of a plurality of "spans" of text from the sentence and a label assigned for each span. The labels output by the machine learning model 201 indicate whether the span has been identified as a named-entity and, if so, which category label has been assigned to the span. In the example of FIG. 2, the machine learning model has identified three different spans 205, 207, 209 in the input sentence 203. The first span 205 has been assigned a "person" label 211 by the machine learning model 201 indicating that the text of the first span 205 has been identified as corresponding to the name of a person. The second span 207 has been assigned a "location" label 213 by the machine learning model 201 indicating that the text of the second span 207 has been identified as corresponding to the name of a location (e.g., a building, a city, a state, a country, etc.). Lastly, the third span 209 has been assigned a "NEG" label 215 by the machine learning model 201. As described in further detail below, the "NEG" label 215 indicates that the machine learning model 201 has determined that the text of the third span 209 does not correspond to any named entity.

Each "span" may include a single word from the input sentence or a combination of multiple words from the input sentence. For example, if the sentence "I like running" were provided as input to the machine learning model 201, the machine learning model in some implementations may be configured to produce the following spans as output: [I], [like], [running], [I like], [like running], and [I like running]. Although the specific example of FIG. 2 shows the machine learning model 201 producing only 3 spans as output, in other implementations, the machine learning model 201 may be configured to output more or fewer identified spans. Similarly, in some implementations, the number of spans produced as output may vary depending on the sentence that is provided as input. In fact, in some implementations, the machine learning model 201 may be configured to produce as output all possible spans in the input sentence.

As a further example, if the sentence "George lives in London" were provided as the input 203, a trained machine learning model 201 may be configured to produce as output the following combinations of spans and labels:

TABLE 1

| SPAN | LABEL |
|---|---|
| [George] | PER ("person") |
| [lives] | NEG |
| [in] | NEG |
| [London] | LOC ("location") |
| [George lives] | NEG |
| [George lives in] | NEG |
| [George lives in London] | NEG |
| [lives in] | NEG |
| [lives in London] | NEG |
| [in London] | NEG |

Figure 3:
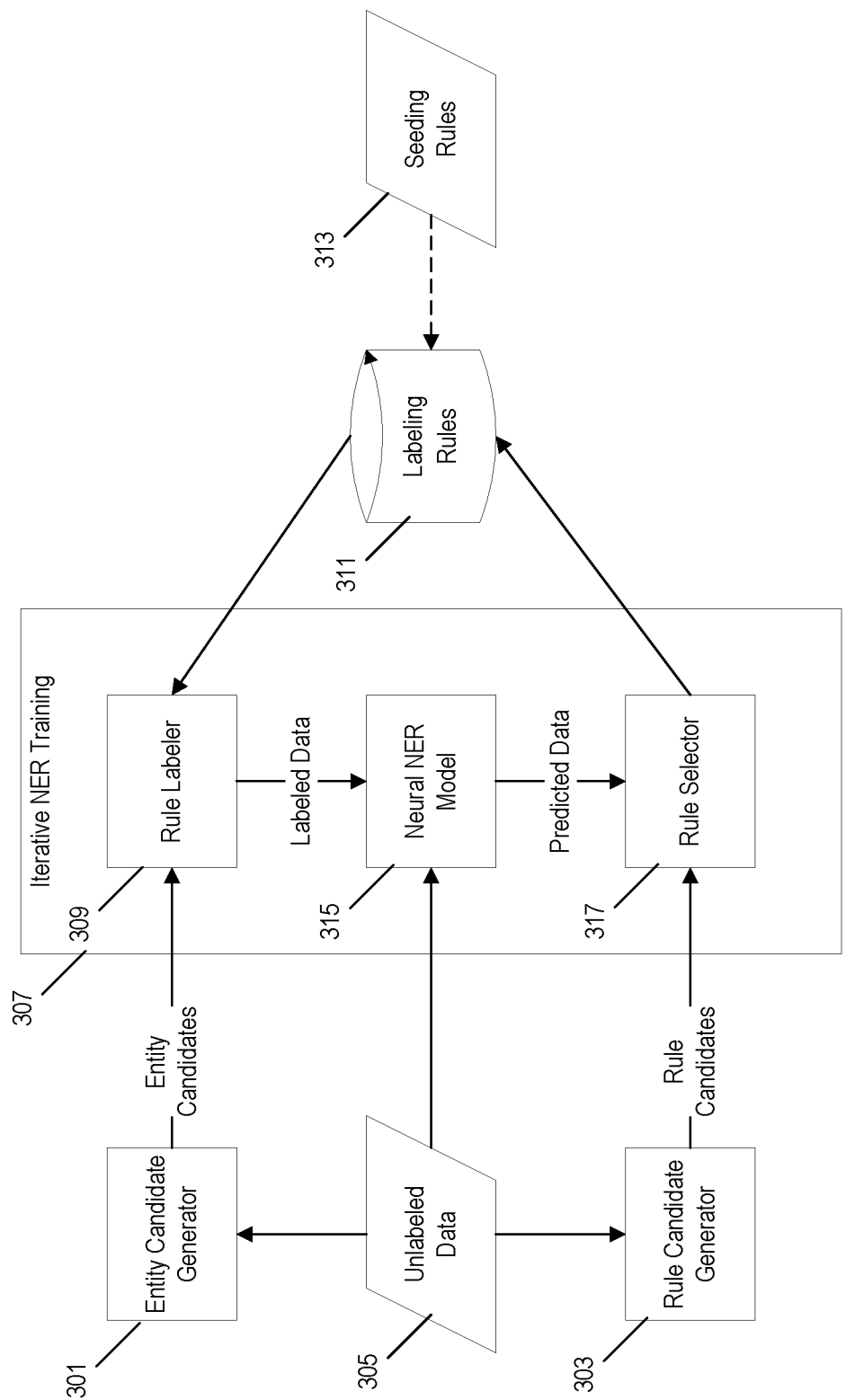
FIG. 3 is a schematic diagram of a system framework for training the NER mechanism in the system of FIG. 1 using automatically generated logical rules.

FIG. 3 illustrates an example of a framework for training the machine-learning model 201 of FIG. 2 to perform named-entity recognition and labeling for an unstructured text input. An entity candidate generator 301 and a rule candidate generator 303 are both applied to a set of unlabeled training data 305. The entity candidate generator 301 is configured to automatically process the input text 305 to identify all possible candidates (e.g., "spans") in the input text 305. Similarly, the rule candidate generator 303 is configured to automatically generate potential "candidate rules" from the unlabeled data that might be used to determine whether or not a particular "span" is a named entity.

The entity candidates and rule candidates are provided as input to an iterative NER training module 307. A rule labeler 309 automatically applies a set of labeling rules 311 to each entity candidate and assigns labels to the entity candidates. As described in further detail below, on the first iteration of the iterative NER training module 307, the labeling rules 311 includes a basic set of seeding rules 313. The labeled data from the rule labeler 309 is then provided as the training input for a neural NER model 315. The original unlabeled data 305 is then provided as input data to the trained neural NER model 315 to produce a "predicted data" output. The predicted data includes an identification of one or more spans and a label assigned to the span by the trained neural NER model 315 (see, e.g., Table 1 above). A rule selector 317 is then configured to score and select the most accurate labelling rules from the set of rule candidates (generated by the rule candidate generator 303) by applying the rule candidates to the unlabeled data and comparing the results of each rule to the predicted data output by the neural NER model 315.

The set of rule candidates that have been identified by the rule selector 317 as being the most accurate are then used as the labeling rules 311 for the next iteration. In the next iteration of the iterative NER training module 307, the rule labeler 309 applies the selected set of rules to the entity candidates to produce a new set of labeled data and the new set of labeled data is used as training data to retrain the neural NER model 315. The updated neural NER model 315 is then applied to the unlabeled data 305 to produce a new set of predicted data and the rule selector 317 identifies the set of rule candidates that produce results that most accurately match the output of the updated neural NER data 315. In various implementations, this iterative process 307 is repeated until an exit condition is reached (e.g., after a defined number of iterations, after a defined performance metric is achieved, or until the rule selector 317 converges on a particular set of labeling rules).

Figure 4:
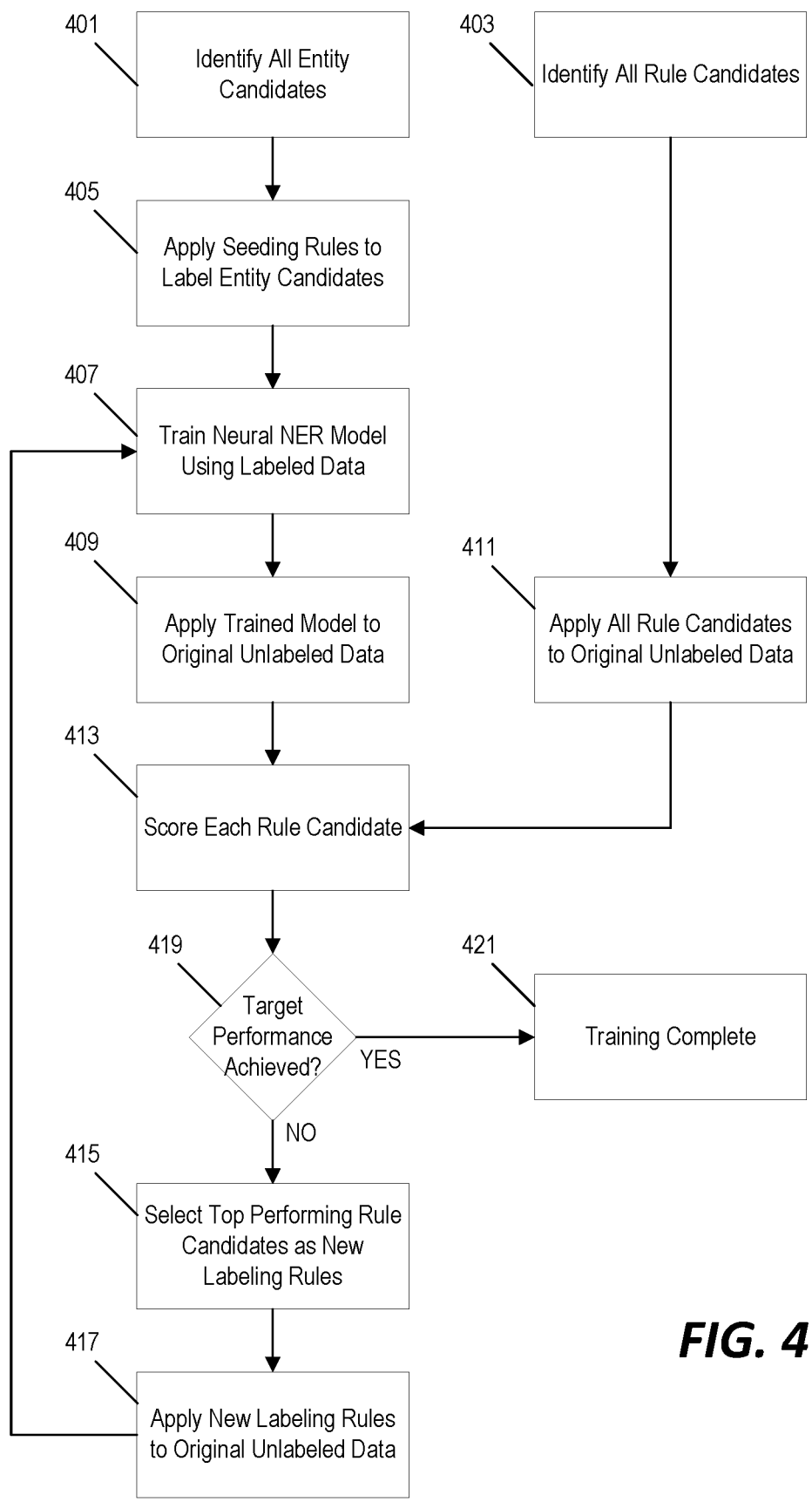
FIG. 4 is a flowchart of a method for training the NER mechanism of FIG. 2 using the system framework of FIG. 3.

FIG. 4 illustrates an example of a method applied by the system of FIG. 1 to train a machine-learning mechanism (e.g., an artificial neural network) using the framework of FIG. 3 to perform named-entity recognition and labeling (e.g., as illustrated in the example of FIG. 2). The system 100 begins by applying the entity candidate generator 301 to the unlabeled data 305 to identify all entity candidates (step 401) and applies the rule candidate generator 303 to the unlabeled data to identify all rule candidates (step 403). Next, the system 100 applies a set of seeding rules 213 to the entity candidates to label the entity candidates (step 405) and uses this "weakly labeled" data set as training data to train a neural NER model 315 (step 407). The system 100 then applies the initial trained neural NER model 315 to the original unlabeled data 305 (step 409) to produce a set of "predicted data" labels. Each rule candidate from the rule candidate generator 303 is also applied to the original unlabeled data (step 411) and the accuracy of each rule candidate is scored (step 413) by comparing the results of the rule candidate to the set of "predicted data" labels from the initial trained neural NER model 315. The system identifies the top performing rule candidates (e.g., the rule candidates that produce labels that most accurately match the set of "predicted data" labels produced by the neural NER model) (step 415). The system 100 then applies this identified set of top performing rule candidates to the original unlabeled data as the new labeling rules (step 417) and retrains the neural NER model using the data labeled by the new set of labeling rules as the training data (step 407). The retrained neural NER model 315 is then applied to the original unlabeled data to produce a new set of "predicted data" labels (step 409) and each rule candidate is scored again—this time by comparing the labels generated by each rule candidate to the new set of predicted data labels generated by the retrained neural NER model (step 413).

After each iteration, the system 100 determines whether a target performance of the neural NER model 315 has been achieved (step 419). If not, then the system 100 performs another iterative retraining of the neural NER model 315. However, once the system 100 determines that the target performance has been achieved, the training is complete (step 421). In some implementations, the neural NER model 315 can then be further trained using the method of FIG. 4 and a different set of unlabeled data while, in other implementations, the trained neural NER model 315 may be ready for use.

The training framework of FIG. 3 takes advantage of both explicit logical rules and neural representations to find new entities from an unlabeled corpus iteratively. Because the framework uses logical rules to obtain "weak" labels and recognizes entities, each system prediction can be traced back to original logical rules, which makes the prediction results explainable.

In some implementations, the rule candidate generator 303 is configured to use rule templates (e.g., atomic rules and composed rules) in order to extract possible rule candidates from the unlabeled data 305. "Atomic rules" are rules that can be used to depict one signal aspect of a candidate entity while "composed rules" are rules that can be used to match multiple aspects of an entity. In some implementations, atomic rule $r_{t_i}$ is the atomic matching logic generated from a rule template $t_i$. Every atomic rule is associated with an entity label. Examples of atomic rule templates include: (1) SurfaceForm (surface name matching with a given full name of entities (e.g., if x match "London," then x is a LOC)), (2) Prefix (matching the prefix of a candidate span (e.g., if x match "Lon*," then x is a LOC)), (3) Suffix (matching the suffix of a candidate span (e.g., if x match "*don," then x is a LOC)), (4) PreNgram (matching the left context of a candidate span (e.g., if "located in x", then x is a LOC), (4) PostNgram0 (matching the right context of a candidate span (e.g., if "x town", the x is a LOC)), (5) POStag (matching the part-of-speech pattern of a candidate span), and (6) PreDependency (the parent and siblings of a span on it dependency tree).

Consider, for example, the following sentence: "The new company is called AdOn GmbH and is located in Hamburg." If we use a PreNgram rule "company is called {*}", then we will match the following spans: [AdOn], [AdOn GmbH], [AdOn GmbH and], etc. until up to the maximum length of the span. Accordingly, the use of only atomic rules would introduce many "noisy" spans (i.e., spans that are incorrectly identified as "named entities" by the atomic rule).

Composed rules are a composition of multiple atomic rules by logical conjunction "^", logical disjunction "v", or other logical operators, which are formulated as:

$$r_{composed} = \mathcal{L}(r_1, r_2, \ldots, r_n) \quad (1)$$

Where $r_1, r_2, \ldots, r_n$ are atomic rules and $\mathcal{L}$ is a logical function to connect the atomic rules. Consider again the sentence: "The new company is called AdOn GmbH and is located in Hamburg." If we have a composed rule "(company is called {*}, PROPN)" from the template (PreNgram^POStag), where "PROPN" denotes the part-of-speech tags for proper nouns, we will exactly match with the entity [AdOn GmbH].

Accordingly, in some implementations, for every candidate entity, the rule candidate generator 303 will extract all of its rules according to the given rule templates. The effective rules for different domains may be different. Therefore, the system could potentially be configured to use different types of rules for different target domains. For example, in some biomedical domain datasets, prefix and suffix rules are more efficient rule templates than part-of-speech tags. In some implementations, the framework illustrated in the example of FIG. 3 above allows the user to customize their rule templates according to their dataset and domain.

As discussed above, the rule labeler 309 is configured to receive a set of unlabeled candidate entities (i.e., spans) & a set of labeling rules 311 and to apply the labeling rules on unlabeled spans to obtain weakly labeled data. In some situations, it is possible that different rules may produce different labels for the same candidate entity. Accordingly, in some implementations, the system 100 is configured to use a major voter method to deal with rule conflicts. For example, if a candidate entity is matched with three rules in total and two rules label the candidate entity as a "location" while the third rule labels the entity as an "organization," system 100 will assign the "location" label to this candidate entity using majority voting. In some implementations, if an equal number of rules apply each different label to the candidate entity (e.g., a "tie"), the system 100 would be configured to label the candidate entity as "ABSTAIN" which means that this candidate entity would not be assigned a label for training the neural NER model 315.

As discussed above in reference to FIG. 2, in some implementations, the machine learning model 201 (e.g., the neural NER model 315) is configured to produce as output a set of different spans and a label assigned to each output span. Given a sentence $x=[w_1, w_2, \ldots, w_n]$ of n tokens, a span $s_i=[w_{b_i}, w_{b_{i+1}}, \ldots w_{e_i}]$, where $b_i$ and $e_i$ are the start and end indices respectively, a span can be represented by two components: a content representation $z_i^c$ calculated as the weighted average across all token embeddings in the span, and a boundary representation $z_i^u$ that concatenates the embeddings at the start and end positions of the span. Specifically:

$$c_1, c_2, \ldots, c_n = \text{TokenRepr}(w_1, w_2, \ldots, w_n) \quad (2)$$

$$u_1, u_2, \ldots, u_n = \text{BiLSTM}(c_1, c_2, \ldots, c_n) \quad (3)$$

$$z_i^c = \text{SelfAttn}(c_{b_i}, c_{b_{i+1}}, \ldots c_{e_i}) \quad (4)$$

$$z_i^u = [u_{b_i}; u_{e_i}] \quad (5)$$

$$z_i = [z_i^c; z_i^u] \quad (6)$$

where TokenRepr is an embedding layer (which can be non-contextualized or contextualized), BiLSTM is a bi-directional LSTM layer, and SelfAttn is a self-attention layer.

In some implementations, the neural NER model 315 is configured to predict labels for all spans up to a fixed length of l words using a multilayer perceptron (MLP):

$$o_i = \text{softmax}(\text{MLP}^{span}(z_i)) \quad (7)$$

where $o_i$ is the prediction for the span. As discussed above, in some implementations, a negative label NEG is used as an additional label to indicate invalid spans (e.g., spans that are not named entities in the unlabeled data).

As discussed above, a rule candidate generator 303 is configured to generate all candidate rules from unlabeled data using pre-defined rule templates. In some implementations of the learning framework of FIG. 3, the system is configured to automatically select new labeling rules from the rule candidates using a rule selector 317. In each iteration, the rule selector 317 scores all candidate rules and selects the top-scored rules as new labeling rules 311. For example, in some implementations, the system first estimates the possible labels for all candidate spans using the trained neural NER model 315 (i.e., the set of "predicted data" labels), and then scores each candidate rule by comparing the results of each rule to these weakly estimated labels. In some implementations, a score for each candidate rule $r_i$ may be calculated using the equation:

$$F(r_i) = \frac{F_i}{N_i} \times \log_2 F_i \quad (8)$$

where $F_i$ is the number of category members extracted by rule $r_i$ (i.e., "correctly" labeled spans) and $N_i$ is the total number of spans extracted by rule $r_i$. This method considers both the precision and recall of rules because the $$\frac{F_i}{N_i}$$

component is the precision score of the rule and the $\log_2 F_i$ component represents the rules' ability to categorize more spans. For example, if a rule $r_i$ matches 100 instances ($N_1=100$) and 80 of the spans that match the rule were also assigned the same label by the neural NER model 315 ($F_1=80$), then the score for the rule $r_1$ would be $F(r_1)=5.06$.

In some implementations, the system is configured to identify a defined number (N) of the top scoring rules for each rule template and for each entity category as the new labeling rules for the next iteration. In some implementations, the system is configured to use N=5 for the first iteration. In some implementations, the system is also configured to prevent low precision rules from being added to the pool of labeling rules by setting a threshold (r=0.8) for precision of rules. This method allows a variety of patterns to be considered yet is precise enough that all of the patterns are strongly associated with the entity category.

Accordingly, the systems and methods described in the examples above provide, among other things, a mechanism for weakly supervised training of a machine-learning-based named-entity recognition (NER) model by iteratively scoring a set of automatically generated rule candidates against the trained NER model and using the highest scoring rule candidates to generate training data labels for a subsequent retraining iteration of the NER model. Features and advantages of this invention are set forth in the following claims.

What is claimed is:

1. A method of training a machine-learning model to perform named-entity recognition of unlabeled text data, the machine-learning model being configured to receive the unlabeled text data as input and to produce as output one or more text spans identified as named-entities and a category label assigned to each of the one or more text spans identified as named-entities, the method comprising:
    identifying, by an electronic processor, a plurality of entity candidates from an input data set of unlabeled text, each entity candidate of the plurality of entity candidates including a text span from the input data set;
    applying, by the electronic processor, a set of seeding rules to the input data set to assign a label to each entity candidate of the plurality of entity candidates;
    training the machine-learning model using the labels assigned to the plurality of entity candidates using the set of seeding rules as a first set of training data;
    applying the trained machine-learning model to the unlabeled text of the input data set to produce a first set of predicted data, the first set of predicted data including one or more text spans from the unlabeled text identified as named-entities and a category label assigned to each of the one or more text spans identified as named-entities;

automatically generating, by the electronic processor, a plurality of rule candidates from the input data set of unlabeled text, wherein each rule candidate of the plurality of rule candidates is generated using a set of rule templates;

applying the plurality of rule candidates to the unlabeled text of the input data set to produce a set of label candidate data;

identifying a subset of rules from the plurality of rule candidates that, when applied to the unlabeled text, assign labels to entity candidates that most accurately match the assigned labels in the first set of predicted data; and retraining the machine-learning model using the labels assigned by the identified subset of rules as a second set of training data.

2. The method of claim 1, further comprising:

applying the retrained machine-learning model to the unlabeled data of the input data set to produce a second set of predicted data, identifying a second subset of rules from the plurality of rule candidates that, when applied to the unlabeled text, assign labels to entity candidates that most accurately match the assigned labels in the second set of predicted data; and further retraining the machine-learning model using the labels assigned by the identified second subset of rules as a third set of training data.

3. The method of claim 1, further comprising iteratively retraining the machine-learning model by repeating the acts of applying the retrained machine-learning model to the unlabeled text of the input data set;

identifying a subsequent subset of rules from the plurality of rule candidates that, when applied to the unlabeled text, assign labels to entity candidates that most accurately match the labels assigned by the retrained machine-learning model; and performing an additional iterative retraining of the machine-learning model using the labels assigned by the subsequent subset of rules as the subsequent set of training data.

4. The method of claim 1, wherein identifying, by the electronic processor, the plurality of entity candidates from the input data set of unlabeled text includes identifying as entity candidates:

text spans of each individual word in the unlabeled text; and text spans of each sequence of two or more sequentially adjacent words in the unlabeled text.

5. The method of claim 1, wherein applying the set of seeding rules to the input data set includes applying a small set of predefined symbolic rules to the input data set.

6. The method of claim 1, wherein automatically generating the plurality of rule candidates from the input data set of unlabeled text includes generating, for each entity candidate of the plurality of entity candidates, every possible rule defined by each rule template in the set of rule templates.

7. The method of claim 1 wherein automatically generating the plurality of rule candidates from the input data set of unlabeled text includes generating a plurality of atomic rules and a plurality of combination rules for each of a plurality of category labels, wherein each atomic rule of the plurality of atomic rules assigns the category label to each entity candidate that meets a single matching criterion defined by the atomic rule, and wherein each combination rule of the plurality of combination rules assigns the category label to each entity candidate that meets matching criteria defined by a different combination of two or more atomic rules.

8. The method of claim 1, wherein identifying the subset of rules from the plurality of rule candidates that assigns labels that most accurately match the assigned labels in the first set of predicted data includes:

assigning a score to each rule candidate based on a number of entity candidates that are assigned a same label by the rule candidate and by the trained machine-learning model; and including in the identified subset of rules a defined number of highest scoring rules for each category label of a plurality of category labels.

9. The method of claim 1, wherein identifying the subset of rules from the plurality of rule candidates that assigns labels that most accurately match the assigned labels in the first set of predicted data includes assigning a score to each rule candidate based at least in part on a ratio of $$\frac{F_i}{N_i},$$

where $F_i$ is a number of entity candidates that are assigned a same label by the rule candidate and by the trained machine-learning model and where $N_i$ is a total number of entity candidates that are assigned the same label by the rule candidate.

10. The method of claim 9, wherein assigning the score to each rule candidate further includes assigning a score to each rule candidate based on a formula:

$$F(r_i) = \frac{F_i}{N_i} \times \log_2 F_i$$

where $F(r_i)$ is the score assigned to a rule candidate $r_i$.

11. A computer-based system for training a machine-learning model to perform named-entity recognition of unlabeled text data, the machine-learning model being configured to receive the unlabeled text data as input and to produce as output one or more text spans identified as named-entities and a category label assigned to each of the one or more text spans identified as named-entities, the system comprising an electronic processor configured to:

identify a plurality of entity candidates from an input data set of unlabeled text, each entity candidate of the plurality of entity candidates including a text span from the input data set;

apply a set of seeding rules to the input data set to assign a label to each entity candidate of the plurality of entity candidates;

train the machine-learning model using the labels assigned to the plurality of entity candidates using the set of seeding rules as a first set of training data;

apply the trained machine-learning model to the unlabeled text of the input data set to produce a first set of predicted data, the first set of predicted data including one or more text spans from the unlabeled text identified as named-entities and a category label assigned to each of the one or more text spans identified as named-entities;

automatically generate a plurality of rule candidates from the input data set of unlabeled text, wherein each rule candidate of the plurality of rule candidates is generated using a set of rule templates;

apply the plurality of rule candidates to the unlabeled text of the input data;

identify a subset of rules from the plurality of rule candidates that, when applied to the unlabeled text, assign labels to entity candidates that most accurately match the assigned labels in the first set of predicted data; and retrain the machine-learning model using the labels assigned by the identified subset of rules as a second set of training data.

12. The system of claim 11, wherein the electronic processor is further configured to:

apply the retrained machine-learning model to the unlabeled data of the input data set to produce a second set of predicted data;

identify a second subset of rules from the plurality of rule candidates that, when applied to the unlabeled text, assign labels to entity candidates that most accurately match the assigned labels in the second set of predicted data; and further retrain the machine-learning model using the labels assigned by the identified second subset of rules as a third set of training data.

13. The system of claim 11, wherein the electronic processor is further configured to iteratively retrain the machine-learning model by repeatedly applying the retrained machine-learning model to the unlabeled text of the input data set;

identifying a subsequent subset of rules from the plurality of rule candidates that, when applied to the unlabeled text, assign labels to entity candidates that most accurately match the labels assigned by the retrained machine-learning model; and performing an additional iterative retraining of the machine-learning model using the labels assigned by the subsequent subset of rules as the subsequent set of training data.

14. The system of claim 11, wherein the electronic processor is configured to identify the plurality of entity candidates from the input data set of unlabeled text by identifying as entity candidates:

text spans of each individual word in the unlabeled text; and text spans of each sequence of two or more sequentially adjacent words in the unlabeled text.

15. The system of claim 11, wherein the electronic processor is configured to apply the set of seeding rules to the input data set by applying a small set of predefined symbolic rules to the input data set.

16. The system of claim 11, wherein the electronic processor is configured to automatically generate the plurality of rule candidates from the input data set of unlabeled text by generating, for each entity candidate of the plurality of entity candidates, every possible rule defined by each rule template in the set of rule templates.

17. The system of claim 11 wherein the electronic processor is configured to automatically generate the plurality of rule candidates from the input data set of unlabeled text by generating a plurality of atomic rules and a plurality of combination rules for each of a plurality of category labels, wherein each atomic rule of the plurality of atomic rules assigns the category label to each entity candidate that meets a single matching criterion defined by the atomic rule, and wherein each combination rule of the plurality of combination rules assigns the category label to each entity candidate that meets matching criteria defined by a different combination of two or more atomic rules.

18. The system of claim 11, wherein the electronic processor is configured to identify the subset of rules from the plurality of rule candidates that assigns labels that most accurately match the assigned labels in the first set of predicted data by:

assigning a score to each rule candidate based on a number of entity candidates that are assigned a same label by the rule candidate and by the trained machine-learning model; and including in the identified subset of rules a defined number of highest scoring rules for each category label of a plurality of category labels.

19. The system of claim 11, wherein the electronic processor is configured to identify the subset of rules from the plurality of rule candidates that assigns labels that most accurately match the assigned labels in the first set of predicted data by assigning a score to each rule candidate based at least in part on a ratio of $$\frac{F_i}{N_i},$$

where $F_i$ is a number of entity candidates that are assigned a same label by the rule candidate and by the trained machine-learning model and where $N_i$ is a total number of entity candidates that are assigned the same label by the rule candidate.

20. The system of claim 19, wherein the electronic processor is further configured to assign the score to each rule candidate by assigning a score to each rule candidate based on a formula:

$$F(r_i) = \frac{F_i}{N_i} \times \log_2 F_i$$

where $F(r_i)$ is the score assigned to a rule candidate $r_i$.

* * * * *